US010759544B2

(12) United States Patent
Mills et al.

(10) Patent No.: US 10,759,544 B2
(45) Date of Patent: Sep. 1, 2020

(54) METHODS AND SYSTEMS FOR CONTROLLING THRUST PRODUCED BY A PLURALITY OF ENGINES ON AN AIRCRAFT FOR ASSISTING WITH CERTAIN FLIGHT CONDITIONS

(71) Applicant: The Boeing Company, Chicago, IL (US)

(72) Inventors: Nikos Mills, Bellevue, WA (US); David Eggold, Mukilteo, WA (US); Heidi Haugeberg, Chicago, IL (US); Douglas Wilson, Mercer Island, WA (US); Leonard Inderhees, Bothell, WA (US); Steven Beland, Chicago, IL (US); Kent Karnofski, Lake Forest Park, WA (US); Christopher Hodges, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 158 days.

(21) Appl. No.: 15/889,306

(22) Filed: Feb. 6, 2018

(65) Prior Publication Data

US 2019/0241273 A1    Aug. 8, 2019

(51) Int. Cl.
*B64D 31/00* (2006.01)
*B64D 31/06* (2006.01)
(Continued)

(52) U.S. Cl.
CPC ............ *B64D 31/06* (2013.01); *B64D 31/14* (2013.01); *B64D 43/02* (2013.01); *G05D 1/0833* (2013.01)

(58) Field of Classification Search
CPC ........ B64D 31/06; B64D 31/14; B64D 43/02; G05D 1/0833
(Continued)

(56) References Cited

U.S. PATENT DOCUMENTS

2013/0203021 A1* 8/2013 Beaud ...................... G09B 5/00
434/35
2015/0197335 A1* 7/2015 Dekel ................. B64C 29/0033
701/5
(Continued)

FOREIGN PATENT DOCUMENTS

| EP | 2 676 883 | 12/2013 |
| EP | 3 173 603 | 5/2017 |
| WO | WO 2011/078847 | 6/2011 |

OTHER PUBLICATIONS

Communication pursuant to Article 94(3) EPC issued by the European Patent Office in application No. 19 152 438.8 dated Aug. 6, 2019.
(Continued)

*Primary Examiner* — Behrang Badii
*Assistant Examiner* — Hossam M Abd El Latif
(74) *Attorney, Agent, or Firm* — McDonnell Boehnen Hulbert & Berghoff LLP

(57) ABSTRACT

In an example, method of controlling thrust produced by a plurality of engines on an aircraft for assisting with nose-down recovery of the aircraft is described. The method includes selecting a maximum value of an aircraft parameter, measuring a value of the aircraft parameter while the aircraft is in flight, based on a comparison of the maximum value and the measured value determining that the measured value exceeds the maximum value, and reducing a thrust produced by each of the engines of the plurality of engines to bring the measured value of the aircraft parameter below the maximum value of the aircraft parameter.

20 Claims, 7 Drawing Sheets

(51) Int. Cl.
  *B64D 31/14*  (2006.01)
  *B64D 43/02*  (2006.01)
  *G05B 19/04*  (2006.01)
  *G05D 1/08*   (2006.01)
(58) Field of Classification Search
  USPC ............................................................ 701/3
  See application file for complete search history.

(56) References Cited

U.S. PATENT DOCUMENTS

| | | | |
|---|---|---|---|
| 2015/0284102 A1* | 10/2015 | Swann | F02C 9/16 |
| | | | 701/3 |
| 2016/0041561 A1* | 2/2016 | Davies | G05D 1/0676 |
| | | | 701/6 |
| 2016/0274739 A1* | 9/2016 | Lepage | G01C 23/00 |
| 2018/0022469 A1* | 1/2018 | Noice | B64D 43/02 |
| | | | 345/520 |
| 2019/0031358 A1* | 1/2019 | Sobanski | F02C 6/20 |

OTHER PUBLICATIONS

Airplane Upset Recovery Training Aid, Revision 2, Nov. 1, 2008, retrieved from the internet: URL:http://www.faa.gov/other_visit/aviation_industry/airline_operators/training/media/AP_UpsetRecovery_Book.pdf [retrieved on Apr. 16, 2013].
European Search Report prepared by the European Patent Office in application No. EP 19 15 2438.8 dated Jul. 8, 2019.

* cited by examiner

SETTING A MAXIMUM AMOUNT BY WHICH THE THRUST MAY BE REDUCED TO PRESERVE A REQUIRED CLIMB CAPABILITY — 228

FIG. 16

DETERMINING THAT A NOSE-DOWN RECOVERY CONDITION EXISTS — 230

BASED ON THE DETERMINATION OF THE NOSE-DOWN RECOVERY CONDITION,

MEASURING THE VALUE OF THE AIRCRAFT PARAMETER WHILE THE AIRCRAFT IS IN FLIGHT — 232

REDUCING THE THRUST PRODUCED BY EACH OF THE ENGINES TO BRING THE MEASURED VALUE OF THE AIRCRAFT PARAMETER BELOW THE MAXIMUM VALUE OF THE AIRCRAFT PARAMETER — 234

FIG. 17

AFTER REDUCING THE THRUST, MEASURING A SECOND VALUE OF THE AIRCRAFT PARAMETER — 236

BASED THE SECOND MEASURED VALUE EXCEEDING THE MAXIMUM VALUE, REDUCING THE THRUST PRODUCED BY EACH OF THE ENGINES BY A SECOND AMOUNT THAT IS LARGER THAN THE FIRST AMOUNT — 238

FIG. 18

ITERATIVELY MEASURING THE VALUE OF THE AIRCRAFT PARAMETER AND REDUCING THE THRUST PRODUCED BY EACH OF THE ENGINES UNTIL THE MEASURED VALUE OF THE AIRCRAFT PARAMETER IS BELOW THE MAXIMUM VALUE OF THE AIRCRAFT PARAMETER — 240

FIG. 19

METHODS AND SYSTEMS FOR CONTROLLING THRUST PRODUCED BY A PLURALITY OF ENGINES ON AN AIRCRAFT FOR ASSISTING WITH CERTAIN FLIGHT CONDITIONS

FIELD

The present disclosure relates generally to operation of an aircraft, and more particularly, to methods of controlling thrust produced by a plurality of engines on an aircraft for assisting with nose-down recovery of the aircraft.

BACKGROUND

An aircraft or an airplane must be capable of promptly recovering from a stall at any angle of attack (AOA) that the airplane can achieve at any permissible power setting. This is required from a regulatory standpoint as specified in 14 CFR § 25.145. Additional requirements and design guidelines applicable to this flight regime may be imposed by an airplane manufacturer. Providing sufficient recovery capability at this condition has traditionally resulted in airplane design compromises affecting cost, complexity, and performance.

Existing methods to provide sufficient recovery capability traditionally manage pitch-up and ensure prompt nose-down recovery from high AOA by applying constraints and modifications to the wing leading edge and trailing edge flap designs to reduce a magnitude of aerodynamic pitch-up; use of stall strips and other flow control devices on the wing leading edge to manage a progression of airflow separation; applying constraints and modifications to a wing anti-ice protection system to reduce a magnitude of aerodynamic pitch-up in icing conditions; and adding area to a horizontal tail to increase stability and pitch control power.

Existing methods impact system complexity, weight, maintenance, and cost. Furthermore, these solutions can negatively impact airplane performance by increasing operational speeds such as a landing approach speed affecting customer performance guarantees and sales.

What is needed is a system to ensure prompt nose-down recovery of the aircraft at critical conditions without having to add complexity to the aircraft design, increase weight, and/or increases costs.

SUMMARY

In an example, a method of controlling thrust produced by a plurality of engines on an aircraft for assisting with nose-down recovery of the aircraft is described. The method comprises selecting a maximum value of an aircraft parameter, measuring a value of the aircraft parameter while the aircraft is in flight, based on a comparison of the maximum value and the measured value, determining that the measured value exceeds the maximum value, and reducing a thrust produced by each of the engines of the plurality of engines to bring the measured value of the aircraft parameter below the maximum value of the aircraft parameter.

In another example, a non-transitory computer readable medium is described having stored thereon instructions, that when executed by one or more processors of a computing device, cause the computing device to perform functions. The functions comprise selecting a maximum value of an aircraft parameter, measuring a value of the aircraft parameter while the aircraft is in flight, based on a comparison of the maximum value and the measured value, determining that the measured value exceeds the maximum value, and reducing a thrust produced by each of the engines to bring the measured value of the aircraft parameter below the maximum value of the aircraft parameter.

In another example, a system is described comprising a flight control computing device having a processor and memory storing instructions executable by the processor to select a maximum value of an aircraft parameter of an aircraft, receive a measurement of a value of the aircraft parameter while the aircraft is in flight, based on a comparison of the maximum value and the measurement, determine that the measurement exceeds the maximum value, and send a signal indicating to reduce a thrust produced by each engine of a plurality of engines of the aircraft to bring the measurement below the maximum value of the aircraft parameter. The system also comprises a plurality of propulsion control computing devices coupled to the plurality of engines of the aircraft, and a respective propulsion control computing device is coupled to a respective engine. Each propulsion control computing device has a processor and memory storing instructions executable by the processor to receive the signal from the flight control computing device and to control thrust produced by the respective engine of the plurality of engines.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 16 shows a flowchart of an example method for use with the method shown in FIG. 6, according to an example implementation.

FIG. 17 shows a flowchart of another example method for use with the method shown in FIG. 6, according to an example implementation.

FIG. 18 shows a flowchart of another example method for use with the method shown in FIG. 6, according to an example implementation.

FIG. 19 shows a flowchart of another example method for use with the method shown in FIG. 6, according to an example implementation.

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, methods and systems for controlling engine thrust from aircraft engines to modify aircraft positioning during extreme/critical conditions are described. More specifically, example methods and systems actively manage an amount of engine thrust produced by each of the engines of the aircraft for assisting with nose-down recovery at high angles of attack and high thrust flight conditions. An amount of thrust generated by all of the engines of the aircraft is actively managed to counter adverse conditions opposing nose-down recovery, i.e., nose-up pitching moments caused by aerodynamic flow separation on the wings and/or by engine-generated nose-up pitching moments.

Example methods and systems continuously monitor various control parameters of the aircraft and compare the monitored parameters with preset maximum conditions. In one example, the system measures longitudinal acceleration ($n_x$), which is a measure of excess engine thrust relative to drag and weight of the aircraft and compares that measurement with a predetermined maximum $n_x$ value. If the measured $n_x$ value exceeds the predetermined maximum $n_x$, then the system modulates the engine thrust generated by each of the engines of the aircraft to cause a reduction in the measured $n_x$ value, which ensures prompt nose-down recovery.

When the methods and systems are activated, the engine thrust may only be reduced by a predetermined amount to ensure continuous safe operation of the aircraft. The methods and systems may only be active during critical control conditions, for example, and do not interfere with normal operation of the aircraft. Additionally, the predetermined maximum values set for the monitored aircraft parameters are limited to a value greater than a capability of performance of the aircraft with only a single engine, thus eliminating a need to include additional monitoring and detection of engine failure. In other words, the methods and systems will not be allowed to activate if the aircraft is operating on one engine. Other control parameters may be employed by the methods and systems in combination with, or in place of, longitudinal acceleration $n_x$. These other parameters may include angle of attack, flight path angle, pitch angle, total energy state of the aircraft, etc.

Figure 1:
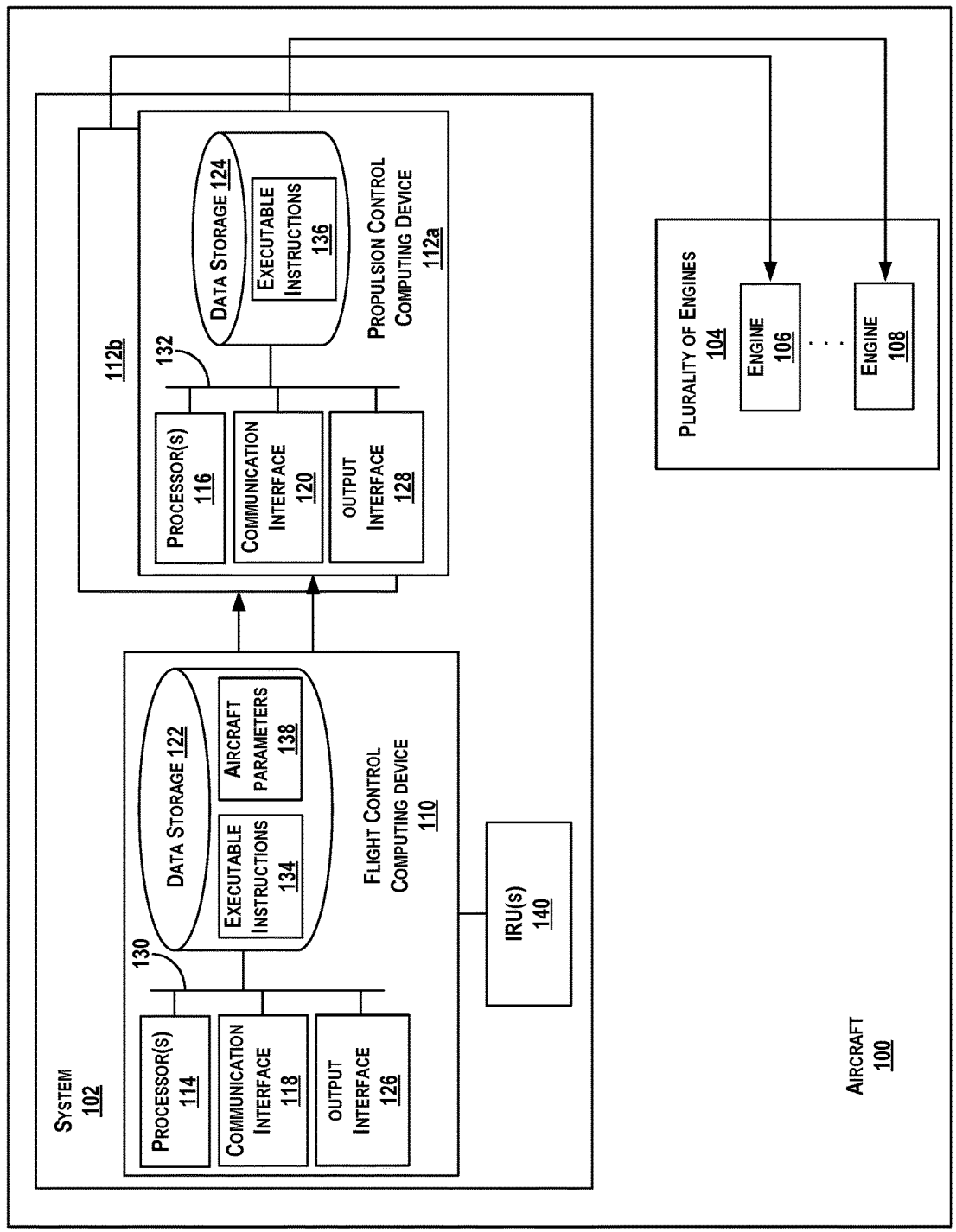
FIG. 1 illustrates a block diagram of an example aircraft, according to an example implementation.

Referring now to the figures, FIG. 1 illustrates a block diagram of an example aircraft 100, according to an example implementation. The aircraft 100 includes a system 102 coupled to a plurality of engines 104. The plurality of engines 104 is shown to include two engines 106 and 108. While the aircraft 100 is illustrated with two engines 106 and 108, more than two engines may be included, and each engine includes substantially the same components, for example.

The system 102 includes a flight control computing device 110 coupled to propulsion control computing device(s) 112*a-b*, either directly or indirectly and using wireless or wired means. The system 102 is shown to include two propulsion control computing devices 112*a-b*, and each is independently coupled to a respective engine 106 and 108. In examples where the aircraft 100 includes more engines, more propulsion control computing devices are included to provide one propulsion control computing device for each engine, for example. Further, each propulsion control computing device 112*a-b* is the same and includes the same components.

Thus, the system 102 includes a plurality of propulsion control computing devices coupled to the plurality of engines 104 of the aircraft 100, and a respective propulsion control computing device is coupled to a respective engine. The propulsion control computing devices 112*a-b* are responsible for operating the engines 106 and 108 to generate thrust according to commands, some of which may include those from the flight control computing device for this function, for example.

Each of the flight control computing device 110 and the propulsion control computing devices 112*a-b* has one or more processors 114 and 116, and also a communication interface 118 and 120, data storage 122 and 124, and an output interface 126 and 128 each connected to a communication bus 130 and 132. The flight control computing device 110 and the propulsion control computing devices 112*a-b* may also include hardware to enable communication within the computing devices and between the computing devices and other devices (not shown). The hardware may include transmitters, receivers, and antennas, for example.

The communication interfaces 118 and 120 may be a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interfaces 118 and 120 may be configured to receive input data from one or more devices, and may also be configured to send output data to other devices.

The data storage 122 and 124 may include or take the form of memory, such as one or more computer-readable storage media that can be read or accessed by the processors 114 and 116. The computer-readable storage media can include volatile and/or non-volatile storage components, such as optical, magnetic, organic or other memory or disc storage, which can be integrated in whole or in part with the processors 114 and 116. The data storage 122 and 124 is considered non-transitory computer readable media. In some examples, the data storage 122 and 124 can be implemented using a single physical device (e.g., one optical, magnetic, organic or other memory or disc storage unit), while in other examples, the data storage 122 and 124 can be implemented using two or more physical devices.

The data storage 122 and 124 thus is a non-transitory computer readable storage medium, and executable instructions 134 and 136 are stored thereon. The instructions 134 and 136 include computer executable code. The data storage 122 of the flight control computing device 110 also stores aircraft parameters 138 (described more fully below).

The processors 114 and 116 may be general-purpose processors or special purpose processors (e.g., digital signal processors, application specific integrated circuits, etc.). The processor(s) 114 and 116 may receive inputs from the communication interfaces 118 and 120 as well as from other sensors, and process the inputs to generate outputs that are stored in the data storage 122 and 124 and used to control the plurality of engines 104. The processors 114 and 116 can be configured to execute the executable instructions 134 and 136 (e.g., computer-readable program instructions) that are stored in the data storage 122 and 124 and are executable to provide the functionality of the computing devices 110 and 112a-b described herein.

The output interfaces 126 and 128 output information, such as outputting information from the flight control computing device 110 to the propulsion control computing devices 112a-b, or outputting information from the propulsion control computing devices 112a-b to the plurality of engines 104. For example, the flight control computing device 110 is coupled to each of the propulsion control computing devices 112a-b to output information. In addition, the propulsion control computing device 112a may output information to the engine 108, and the propulsion control computing device 112b may output information to the engine 106. Each engine can then be independently controlled by a respective propulsion control computing device, for example. Thus, the output interfaces 126 and 128 may be similar to the communication interfaces 118 and 120 and can be a wireless interface (e.g., transmitter) or a wired interface as well.

The system 102 also includes an inertial reference unit(s) (IRUs) 140. The IRU 140 is an inertial sensor that may include or use gyroscopes and accelerometers to determine a change in rotational attitude (angular orientation relative to some reference frame) and translational position (typically latitude, longitude and altitude) of the aircraft 100 over a period of time. The IRU may also be referred to as an inertial measurement unit (IMU). Ti e IRU 140 measures value of an aircraft parameter(s) while the aircraft 100 is in flight, and outputs the measurement of the value of the aircraft parameter to the flight control computing device 110.

Within one example, in operation, when the executable instructions 134 are executed by the processor 114 of the flight control computing device 110, the processor 114 is caused to perform functions including to select a maximum value of an aircraft parameter of the aircraft 100, to receive a measurement of a value of the aircraft parameter while the aircraft 100 is in flight, to determine that the measurement exceeds the maximum value based on a comparison of the maximum value and the measurement, and to send a signal indicating to reduce a thrust produced by each engine 106 and 108 of the plurality of engines 104 of the aircraft 100 to bring the measurement below the maximum value of the aircraft parameter.

The propulsion control computing devices 112a-b are coupled to the plurality of engines 104 of the aircraft 100, and when the executable instructions 136 are executed by the processor 116 of the propulsion control computing devices 112a-b, the processor 116 is caused to perform functions including to receive the signal from the flight control computing device 110 and to control thrust produced by each engine 106 and 108 of the plurality of engines 104. The propulsion control computing devices 112a-b control thrust produced by each engine 106 and 108 of the plurality of engines 104 independently of each other.

Aircraft (e.g., airplanes in particular) must be capable of promptly recovering from a stall at any angle of attack (AOA) that the airplane can achieve at any permissible power setting. The recovery capability from high AOA required from a regulatory standpoint is specified in 14 CFR § 25.145. This requirement is summarized in that the airplane must have prompt nose-down recovery from any AOA that the airplane can achieve with any permissible power setting, with any normal configuration (including speed brakes), trimmed with any power setting at speeds as low as 1.23 VS1g. As such, the airplane shall have sufficient nose down pitch capability to ensure prompt acceleration to the trim speed from the stall speed, power on and off.

Regarding longitudinal control, the airplane must be possible, at any point between the trim speed prescribed in 14 CFR § 25.103(b)(6) and stall identification (as defined in § 25.201(d)), to pitch the nose downward so that the acceleration to this selected trim speed is prompt with the airplane trimmed at the trim speed prescribed in § 25.103 (b)(6), the landing gear extended, the wing flaps (i) retracted and (ii) extended, and power (i) off and (ii) at maximum continuous power on the engines.

Within examples described herein, the flight control computing device 110 and the propulsion control computing devices 112a-b together may execute the executable instructions 134 and 136 to perform a symmetric thrust limiting (STL) function for the aircraft 100 to meet the design requirements noted above. The STL function is a flight control law that actively manages excess engine thrust capability under specific conditions to ensure prompt recovery capability from high angle of attack (AOA) and high thrust conditions in order to meet or exceed the design requirements noted above. The STL function includes reliable and robust detection of the conditions that trigger changes to engine thrust, for example. The system 102 makes use of parameters that are readily measurable, compares the measured parameter value with a predetermined maximum value, and modulates the engine thrust generated by all of the plurality of engines 104 to ensure prompt nose down recovery of the aircraft 100 during critical conditions.

Within examples, thrust control for nose down recovery applies to aircraft configurations where the thrust acts below a center of gravity of the aircraft. Thrust control for nose up control could also be used for nose up control for aircraft configurations with thrust acting above the center of gravity, for example.

Figure 2:
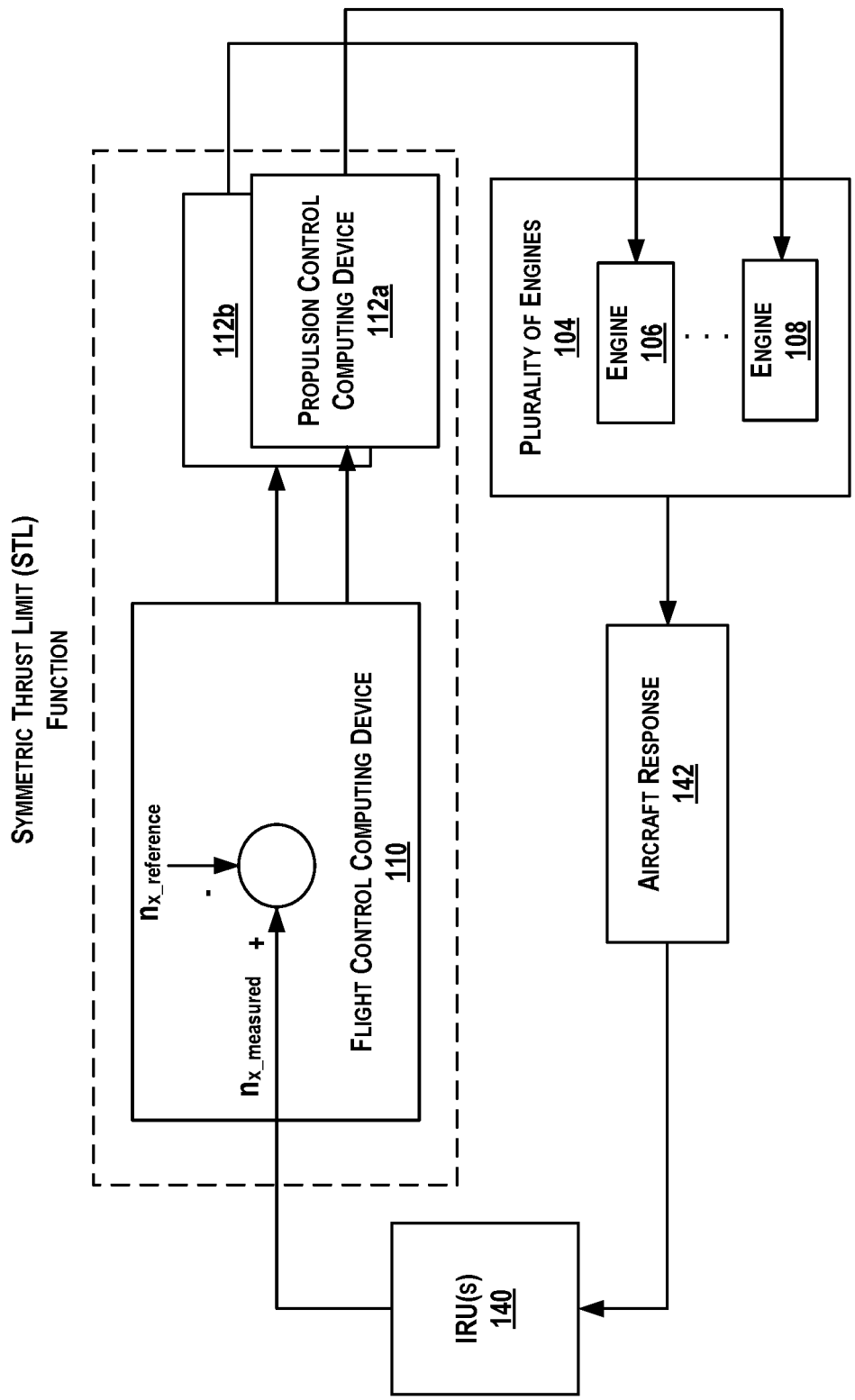
FIG. 2 is a flow diagram illustrating an example operation of the STL function, according to an example implementation.

FIG. 2 is a flow diagram illustrating an example operation of the STL function, according to an example implementation. Initially, a maximum value of an aircraft parameter is selected for monitoring. Many different aircraft parameters may be used for the STL function, and examples include a longitudinal acceleration ($n_x$) of the aircraft 100 (e.g., the longitudinal acceleration ($n_x$) is a measure of excess engine thrust relative to drag and weight of the aircraft 100), an angle of attack (AoA) of the aircraft 100, a flight path angle of the aircraft 100, and/or a pitch angle of the aircraft 100. In addition, more than one parameter may be selected and monitored. The maximum value of the aircraft parameter is selected to be at a limit that provides recovery capability of the aircraft 100 at an AOA above a threshold, for example, and is selected based on a weight of the aircraft 100. In other examples, the maximum value of the aircraft parameter is selected to be a value greater than a value achievable by the aircraft 100 in flight with a single engine failed. For example, with a two engine airplane, the maximum value of the aircraft parameter is selected to be a value greater than a value achievable by the aircraft 100 in flight using a single engine of the plurality of engines 104.

Following, the IRU(s) 140 measure a value of the aircraft parameter while the aircraft 100 is in flight. For instance, in an example where the aircraft parameter is longitudinal acceleration ($n_x$), the IRU(s) 140 measure the longitudinal acceleration ($n_x$) and output the measured value to the flight control computing device 110.

The flight control computing device 110 references the stored aircraft parameters 138, which include the selected or stored maximum values for each aircraft parameter to make a comparison of the measured aircraft parameter to the stored maximum value. For example, as shown in FIG. 2, the flight control computing device 110 compares the measured longitudinal acceleration ($n_x$) with the stored longitudinal acceleration ($n_{x\_reference}$). Based on a comparison of the maximum value and the measured value, the flight control computing device 110 can determine whether the measured value exceeds the maximum value. In instances when the measured value exceeds the maximum value, the flight control computing device 110 sends a signal to the propulsion control computing devices 112a-b indicating to reduce a thrust produced by each of the engines 106 and 108 of the plurality of engines 104 to bring the measured value of the aircraft parameter below the maximum value of the aircraft parameter.

The propulsion control computing devices 112a-b then operate the plurality of engines 104 to reduce the thrust in the manner needed. In one example, the thrust is reduced by an amount proportionate to an amount that the measured value exceeds the maximum value. The propulsion control computing devices 112a-b may set a maximum amount by which the thrust may be reduced to preserve a required climb capability. To determine the amount of thrust reduction, the propulsion control computing devices 112a-b may reduce the thrust produced by each of the engines 106 and 108 by a first amount (e.g., by about 20% of a maximum thrust produced by all engines operating), and then after reducing the thrust, the STL function monitors an aircraft response 142, such as through measurement of a second value of the aircraft parameter, for example. Following, based on the second measured value exceeding the maximum value, the propulsion control computing devices 112a-b reduce the thrust produced by each of the engines 106 and 108 by a second amount that is larger than the first amount (e.g., an additional 5% more). The propulsion control computing devices 112a-b may perform engine thrust reduction on an iterative basis, for example, iteratively measuring the value of the aircraft parameter and reducing the thrust produced by each of the engines 106 and 108 until the measured value of the aircraft parameter is below the maximum value of the aircraft parameter.

As shown in FIG. 2, in real time (during flight of the aircraft 100), the flight control computing device 110 compares the measured $n_x$ relative to $n_{x\_reference}$, and if the output of the summing function is negative, the STL function is not triggered. However, if the aircraft 100 is in a flight condition where the measured $n_x$ is higher than the $n_{x\_reference}$, then the flight control computing device 110 sends a signal to reduce engine thrust by a certain amount. As the measured $n_x$ begins to decrease and the output of the summing function approaches zero, then the STL function is terminated.

Thus, an output of the summing junction represents an error, which can be multiplied by a gain to determine an amount of thrust reduction for each engine. If the error is a high value, a maximum thrust reduction can be commanded (e.g., about 20% thrust reduction), or if the error is low, then a slight/low thrust reduction is commanded. An amount of thrust reduction is then proportional to the error, and the STL function is a closed-loop function operated in an iterative manner to drive the error closer to zero. The maximum amount of thrust reduction can be limited to an amount such that a resulting total thrust capability of the aircraft 100 will be greater than a capability with a single engine failure. As a result, any erroneous activation of the STL function still enables safe thrust levels for the aircraft 100, and this ensures no loss of required climb capability. This limit can be enforced by the flight control computing device 110 and independently by the propulsion control computing devices 112a-b.

Once the measured value of the aircraft parameter is below the maximum value of the aircraft parameter, nose-down recovery of the aircraft 100 is improved and allows pilot command of nose down pitch attitude at that time.

In an example scenario, at a high AOA, there are two primary sources of aircraft nose-up pitching moment that oppose nose-down recovery. First, nose-up pitching moment is caused by aerodynamic flow separation on a wing of the aircraft 100, and this is generally caused by an outboard portion of the wing losing lift capability prior to an inboard portion of the wing. This can occur with ice accumulation on leading edges of the wing as well.

Second, the nose-up pitching moment can be generated by the plurality of engines 104, and this source of pitch-up is composed of a direct thrust contribution and an indirect thrust contribution. The direct thrust contribution to pitch-up is a result of a magnitude of the thrust vector of the plurality of engines 104 multiplied by their moment arm below an aircraft center of gravity. The indirect thrust contribution to pitch-up is caused by changes in aerodynamic flow on the aircraft wing at higher thrust settings. A sum of the direct and indirect thrust components is generally negligible at idle thrust, but significant at maximum thrust. At high AOA, the aerodynamic and thrust pitch-up components can combine to result in either a sluggish nose-down recovery or an unrecoverable stall even with full nose-down pitch control. Some traditional ways of managing this pitch-up have included changes to the wing leading and trailing edge flaps, changes in wing anti-ice coverage, a larger horizontal tail, and restrictions to the aft center of gravity range at light weights.

However, using the STL function described herein, actively managing engine thrust under specific control conditions mitigates the pitch-up caused by the engines and ensures that prompt nose-down recovery capability is available at all achievable AOA's. The STL function enables additional degrees of freedom to the aircraft designer which can be leveraged to find the appropriate balance of system complexity, aircraft performance capability, center of gravity range, and aircraft cost.

Figure 3:
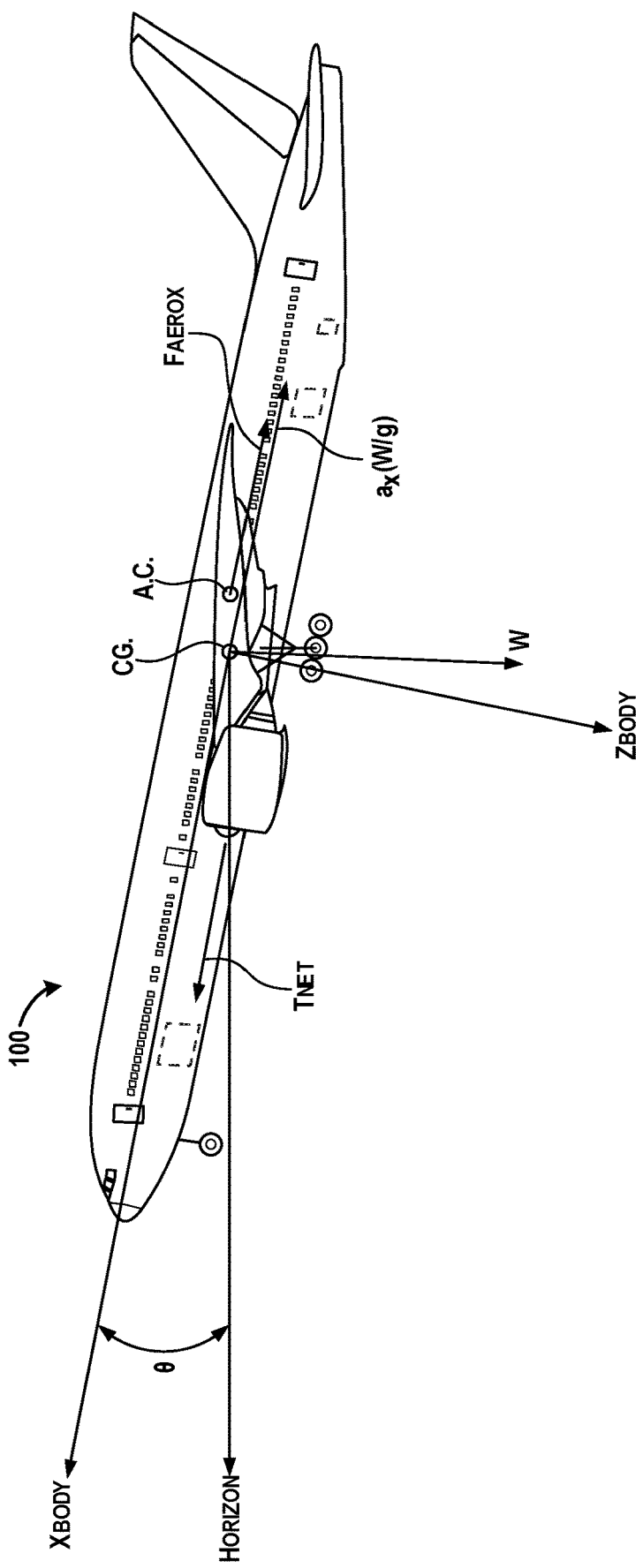
FIG. 3 is an example illustration of the aircraft and forces acting on the aircraft, according to an example implementation.

FIG. 3 is an example illustration of the aircraft 100 and forces acting on the aircraft 100, according to an example implementation. Excess engine thrust capability is determined by comparing measured longitudinal acceleration ($n_x$) to a reference maximum $n_x$, and the longitudinal acceleration ($n_x$) is measured by the IRU(s) 140. The system 102 will actively control engine thrust when the measured $n_x$ exceeds the reference $n_x$, for example. When active, the STL function of the system 102 will issue a command to reduce thrust to all engines 106 and 108 of the plurality of engines 104.

The longitudinal acceleration ($n_x$) is a measure of excess engine thrust capability (e.g., if excess engine thrust capability is high, $n_x$ is high, and if excess engine thrust capability is low, $n_x$ is low). To calculate $n_x$, the forces acting on the aircraft 100 are summed as follows:

$$\sum F_x = T_{NET} - F_{AEROx} - W\sin\theta = a_x\left(\frac{W}{g}\right) \quad \text{Equation (1)}$$

Following, the longitudinal acceleration ($n_x$) is solved for:

$$\frac{a_x}{g} = n_x = \frac{T_{NET} - F_{AEROx} - W\sin\theta}{W} \quad \text{Equation (2)}$$

where $T_{NET}$ is net thrust (1b), $F_{AEROx}$ is aerodynamic forces in the $X_{BODY}$ axis (1b), W is aircraft gross weight (lb), and $n_x$ is acceleration factor along the $X_{BODY}$ axis (g's).

Figures 4, 5:
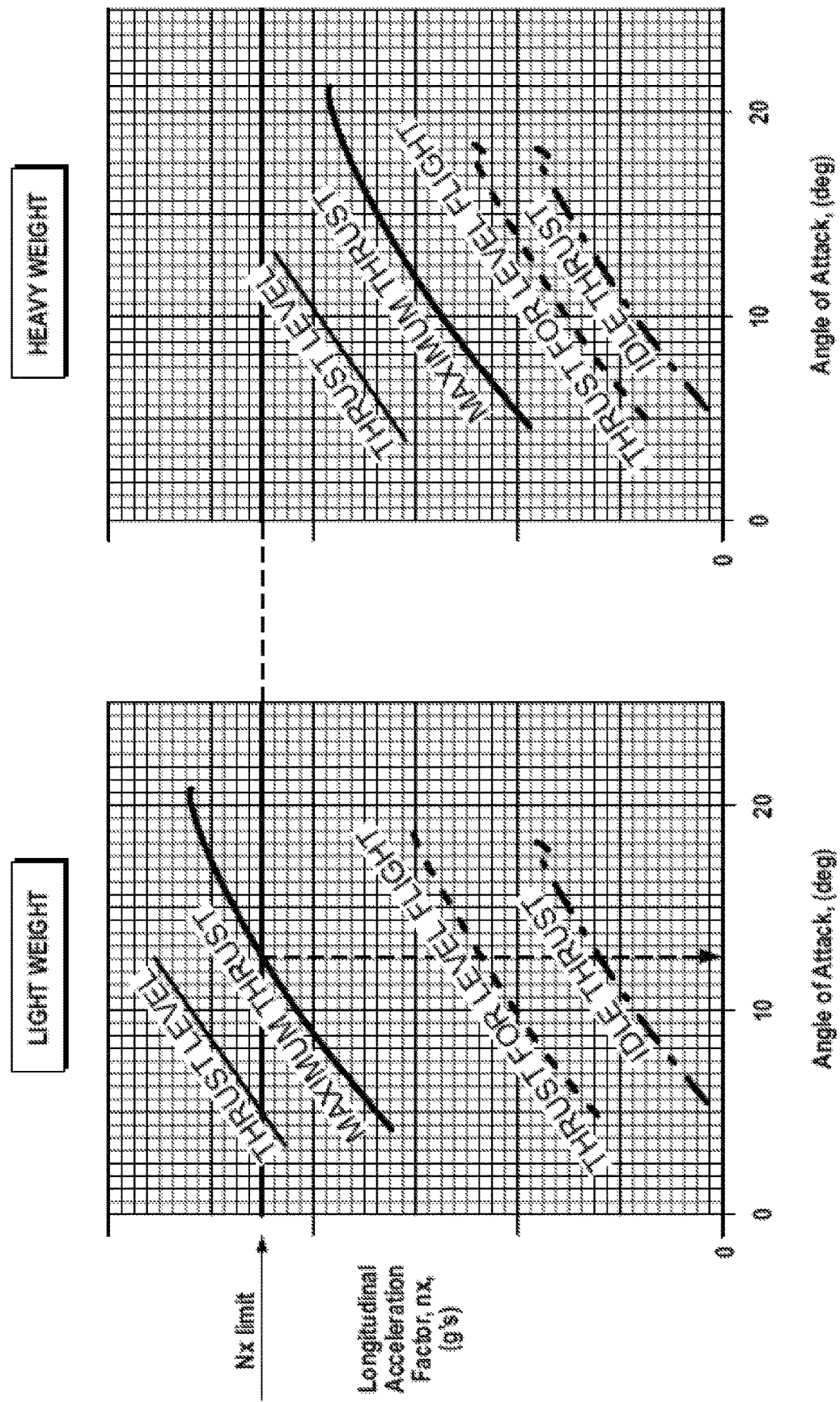
FIG. 4 is an example graph showing a relationship between longitudinal acceleration ($n_x$) (g's) and an angle of attack (AOA) (degrees) with a lightweight aircraft, according to an example implementation.
FIG. 5 is another example graph showing a relationship between longitudinal acceleration ($n_x$) (g's) and an angle of attack (AOA) (degrees) with a heavy weight aircraft, according to an example implementation.

FIG. 4 is an example graph showing a relationship between longitudinal acceleration ($n_x$) (g's) and an angle of attack (AOA) (degrees) with a lightweight aircraft, according to an example implementation. FIG. 5 is another example graph showing a relationship between longitudinal acceleration ($n_x$) (g's) and an angle of attack (AOA) (degrees) with a heavy weight aircraft, according to an example implementation.

Within examples, a light weight aircraft can be considered to be roughly less than 1.25 OEW (Operational Empty Weight), and a heavy weight aircraft can be considered above Maximum Landing Weight (MLW) up to Maximum Takeoff Weight (MTOW), for example. Such absolute weights are aircraft dependent, for example.

The longitudinal acceleration ($n_x$) is a measure of excess engine thrust relative to drag and weight. A high $n_x$ indicates acceleration to change airspeed and/or oppose gravity at a given weight. As shown in FIG. 4, it is possible to select a limit maximum $n_x$ that provides sufficient recovery capability at high AOA for critical conditions where controllability is at risk. For example, if the $n_x$ limit is set above an achievable thrust level for level flight and idle thrust, but below a maximum thrust for a given AOA, then the aircraft will still be able to apply thrust for recovery purposes if needed. However, as shown in FIG. 5, for heavy weight aircraft, the limit maximum $n_x$ may not reduce thrust even at high AOA since the heavy weight causes maximum thrust to be experienced at lower levels of $n_x$.

As shown in the graphs, when $n_x$ is high, the aircraft can use the energy to climb or accelerate as needed, but when $n_x$ is low, this capability is reduced. The $n_x$ threshold or limit is thus set below which it is known the aircraft has sufficient recovery capability and above a level where it is not desirable to activate the STL function.

Active management of maximum thrust on both engines 106 and 108 of the aircraft 100 at specific conditions affecting aircraft controllability can thus be provided. The STL function manages maximum thrust for both engines 160 and 108 while preserving the required climb capability. The STL function is not active for conditions that are not critical for nose-down recovery capability, and therefore does not interfere with normal aircraft operation. The STL function encompasses both logic to detect critical control-limited conditions and to command and modulate thrust on both engines to ensure prompt nose-down recovery.

As shown in FIGS. 4-5, it is possible to select a limit maximum $n_x$ that provides sufficient recovery capability at high AOA for critical conditions where controllability can be at risk while providing thrust needed for normal and emergency situations. Use of a high-availability inertial signal like $n_x$ makes it possible for the STL function to be available in most, if not all, airplane operational states.

As mentioned, the STL function is only activated during flight of the aircraft 100 and upon detection of a condition, e.g., measured $n_x$ being above a preset threshold $n_x$. Once triggered, the STL function causes a reduction in engine thrust of the engines 106 and 108 on the aircraft 100 and there is a limit to an amount of the reduction to limit exposure to risks of removing all thrust capability. The thrust reduction limit can be set to a maximum of about 20% on both engines 106 and 108, about 10% on both engines 106 and 108, and/or between about 5% to about 20%, for example. The thrust reduction limit can be set to any range between greater than 0% and a maximum reduction of 20%, for example.

The STL function will not activate if only one engine is failed on the aircraft 100, or if less than a threshold number of the plurality of engines 104 are operating on the aircraft 100. Thus, the STL function manages engine thrust only when all engines are operating at high thrust, and the STL would not limit thrust during climb-limited states such as engine-out operation.

In an example where the aircraft 100 has two engines, if only one engine is operating, the aircraft 100 likely would not be able to sustain a 20% reduction of thrust on that one operating engine and still maintain climb capabilities. Thus, to avoid this scenario, the STL function has the aircraft parameter threshold set to be below a threshold for activation in single-engine circumstances such that the STL function would not activate in the single-engine circumstances. For example, using $n_x$ as the monitored aircraft parameter, a high $n_x$ level can only occur with both engines operating at high power relative to gross aircraft weight. Thus, the $n_x$ threshold can be set sufficiently above the single engine thrust capability, as well as above other engine-out control limits. The $n_x$ threshold is aircraft dependent, and an example range can include between about 0.4 to about 0.5 g, for example. Requiring the $n_x$ threshold to be set above a certain level eliminates the need for the STL function to require an independent engine detection loss feature, which reduces overall system complexity and potential failure modes.

Figure 6:
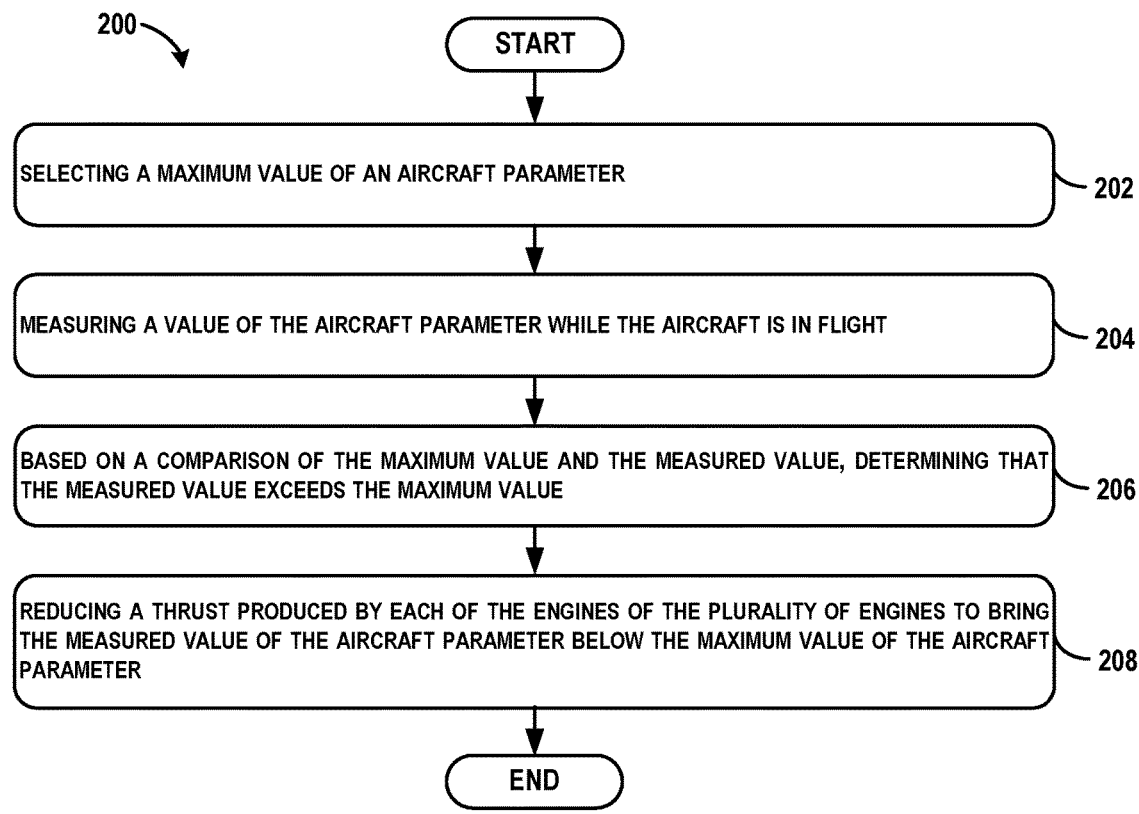
FIG. 6 shows a flowchart of an example method of controlling thrust produced by the plurality of engines on the aircraft for assisting with nose-down recovery of the aircraft, according to an example implementation.

FIG. 6 shows a flowchart of an example method 200 of controlling thrust produced by the plurality of engines 104 on the aircraft 100 for assisting with nose-down recovery of the aircraft 100, according to an example implementation. Method 200 shown in FIG. 6 presents an example of a method that could be used with the aircraft 100 shown in FIG. 1 or with components of the aircraft 100, for example. Further, devices or systems may be used or configured to perform logical functions presented in FIG. 6. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 6, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes selecting a maximum value of an aircraft parameter.

Figure 7:
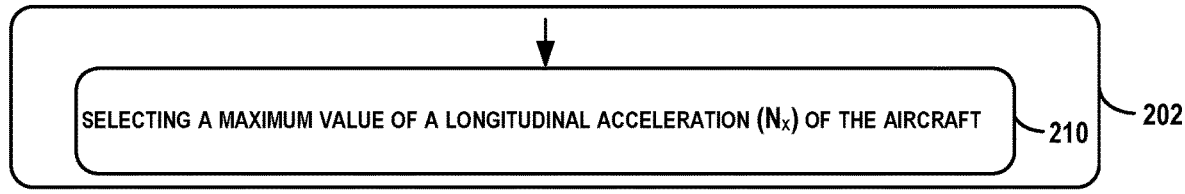
FIG. 7 shows a flowchart of an example method for performing the selecting function of the method of FIG. 6, according to an example implementation.

FIG. 7 shows a flowchart of an example method for performing the selecting as shown in block 202, according to an example implementation. At block 210, functions include selecting the maximum value of the aircraft parameter comprises selecting a maximum value of a longitudinal acceleration ($N_x$) of the aircraft. An example maximum longitudinal acceleration ($N_x$) value can be in a range of between about 0.4 to about 0.5 g.

Figure 8:
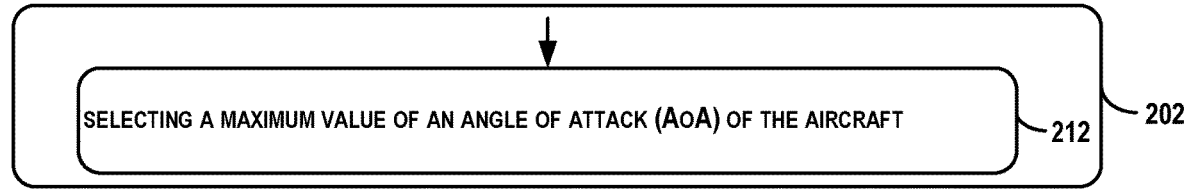
FIG. 8 shows a flowchart of another example method for performing the selecting function of the method of FIG. 6, according to an example implementation.

FIG. 8 shows a flowchart of an example method for performing the selecting as shown in block 202, according to an example implementation. At block 212, functions include selecting the maximum value of the aircraft parameter comprises selecting a maximum value of an angle of attack (AoA) of the aircraft. The AoA of an aircraft is aircraft dependent, and an example maximum value of an AoA is typically above stick shaker AoA.

Figure 9:
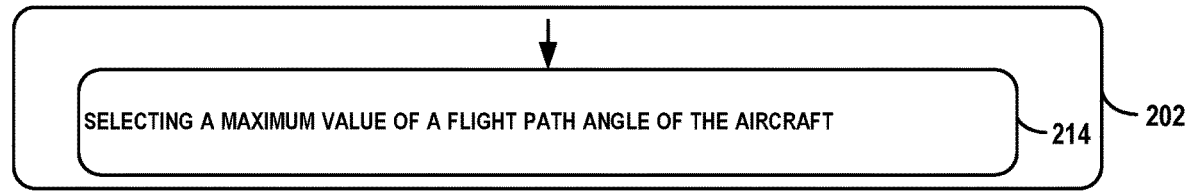
FIG. 9 shows a flowchart of another example method for performing the selecting function of the method of FIG. 6, according to an example implementation.

FIG. 9 shows a flowchart of an example method for performing the selecting as shown in block 202, according to an example implementation. At block 214, functions include selecting the maximum value of the aircraft parameter comprises selecting a maximum value of a flight path angle of the aircraft. A maximum value of a flight path angle of the aircraft may be about above 15 degrees, for example.

Figure 10:
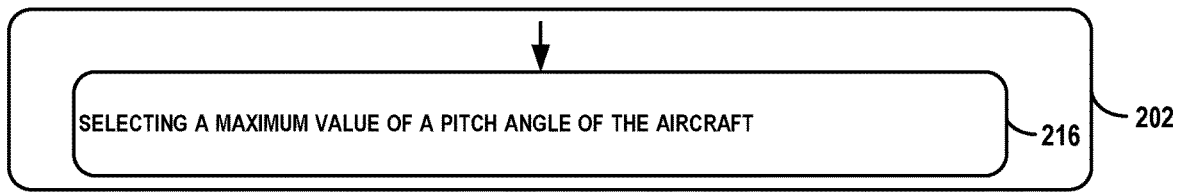
FIG. 10 shows a flowchart of another example method for performing the selecting function of the method of FIG. 6, according to an example implementation.

FIG. 10 shows a flowchart of an example method for performing the selecting as shown in block 202, according to an example implementation. At block 216, functions include selecting the maximum value of the aircraft parameter comprises selecting a maximum value of a pitch angle of the aircraft. A maximum value of a pitch angle of the aircraft may be about above 25 degrees, for example.

Figure 11:
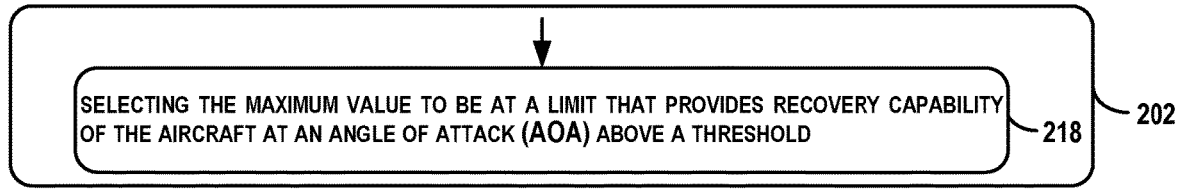
FIG. 11 shows a flowchart of another example method for performing the selecting function of the method of FIG. 6, according to an example implementation.

FIG. 11 shows a flowchart of an example method for performing the selecting as shown in block 202, according to an example implementation. At block 218, functions include selecting the maximum value to be at a limit that provides recovery capability of the aircraft at an angle of attack (AOA) above a threshold.

Figure 12:
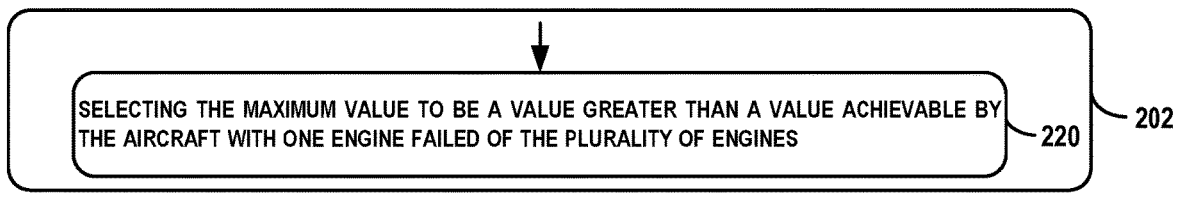
FIG. 12 shows a flowchart of another example method for performing the selecting function of the method of FIG. 6, according to an example implementation.

FIG. 12 shows a flowchart of an example method for performing the selecting as shown in block 202, according to an example implementation. At block 220, functions include selecting the maximum value to be a value greater than a value achievable by the aircraft in flight using a single engine of the plurality of engines. As an example, for longitudinal acceleration, the maximum $n_{x\_reference}$ is selected that is only achievable at light weight, high thrust, and high AoA, which, by definition, means that single engine operation will not be exceeded using this reference value. In other words, if the $n_x$ reference is set to be about 0.4 g and with single engine, the aircraft is only achieving 0.15 g, then the function will not become active in single engine scenarios.

Figure 13:
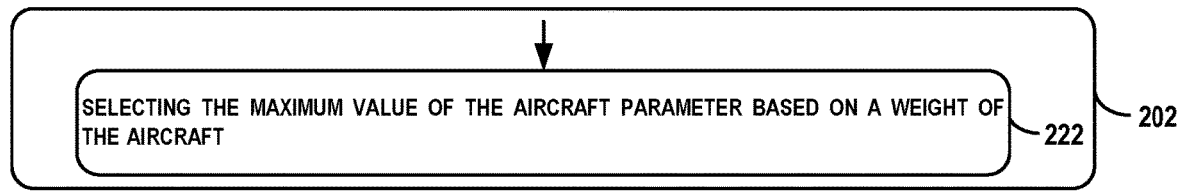
FIG. 13 shows a flowchart of another example method for performing the selecting function of the method of FIG. 6, according to an example implementation.

FIG. 13 shows a flowchart of an example method for performing the selecting as shown in block 202, according to an example implementation. At block 222, functions include selecting the maximum value of the aircraft parameter based on a weight of the aircraft (e.g., as shown in FIGS. 4-5).

In still further examples, selecting as shown in block 202 may include defining the parameter as total energy state of the aircraft. For example, the longitudinal acceleration $n_x$ has a direct correlation with a total energy state of the aircraft 100. It robustly identifies thrust, altitude, and airspeed combinations that are critical for high-AOA pitch recovery.

Any of the parameters as described in FIGS. 7-13 can be used for the method 200, either alone or in any combination, to trigger following functions of the method 200.

Figure 14:
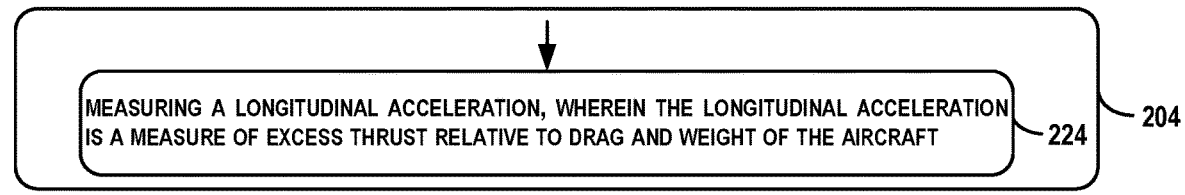
FIG. 14 shows a flowchart of another example method for performing the measuring function of the method of FIG. 6, according to an example implementation.

Returning to FIG. 6, at block 204, the method 200 includes measuring a value of the aircraft parameter while the aircraft is in flight. FIG. 14 shows a flowchart of an example method for performing the measuring as shown in block 204, according to an example implementation. At block 224, functions include measuring a longitudinal acceleration, wherein the longitudinal acceleration is a measure of excess thrust relative to drag and weight of the aircraft.

Returning to FIG. 6, at block 206, the method 200 includes based on a comparison of the maximum value and the measured value, determining that the measured value exceeds the maximum value. For example, the flight control computing device 110 compares the maximum value selected for the aircraft parameter with the measured value of the aircraft parameter while in flight to determine whether the measured value exceeds the maximum set value.

At block 208, the method 200 includes reducing a thrust produced by each of the engines of the plurality of engines to bring the measured value of the aircraft parameter below the maximum value of the aircraft parameter. In one example, the amount of thrust reduction for each engine is the same so as to provide symmetric thrust reduction of all engines on the aircraft 100. As mentioned above, a limit can be imposed as to a maximum amount of reduction of thrust on the engines of about 20%, for example.

The thrust reduction can be performed symmetrically on each of the engines 106 and 108 of the aircraft so as to reduce thrust in the same manner for each, and at the same time (i.e., simultaneously).

In examples, thrust may be limited as a function of a thrust coefficient (e.g., total thrust divided by dynamic pressure) and/or limited to a specified thrust schedule (e.g., scheduled with airspeed, AoA, theta, flight path). A thrust schedule can replace the feedback path of the aircraft parameter to reduce thrust by increments, for example.

Figure 15:
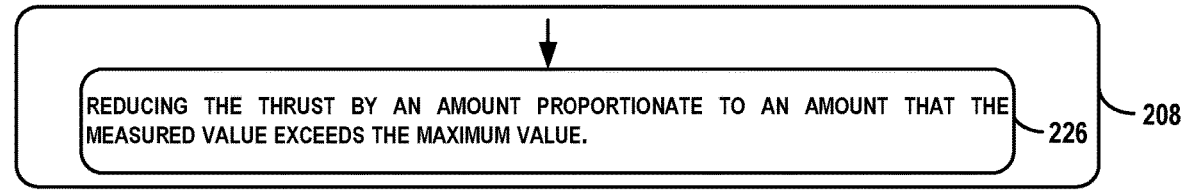
FIG. 15 shows a flowchart of an example method for performing the reducing function of the method of FIG. 6, according to an example implementation.

FIG. 15 shows a flowchart of an example method for performing the reducing as shown in block 208, according to an example implementation. At block 226, functions include reducing the thrust by an amount proportionate to an amount that the measured value exceeds the maximum value. In this example, the comparison of the measured to maximum value is like an error amount, and when the error observed is high, then a larger reduction can be made for a larger corrective action.

FIG. 16 shows a flowchart of an example method for use with the method 200, according to an example implementation. At block 228, functions include setting a maximum amount by which the thrust may be reduced to preserve a required climb capability. As mentioned above, the maximum thrust reduction can be limited, and here, limited to a value that still preserves required climb capability for certain flight requirements.

FIG. 17 shows a flowchart of an example method for use with the method 200, according to an example implementation. At block 230, functions include determining that a nose-down recovery condition exists. Reliable and robust critical condition detection can be performed by comparing measured longitudinal acceleration $n_x$ to a limit maximum $n_x$. Nx can be sensed directly by the IRU(s) 140, for example. Following, based on the determination of the nose-down recovery condition, functions include measuring the value of the aircraft parameter while the aircraft is in flight, and reducing the thrust produced by each of the engines to bring the measured value of the aircraft parameter below the maximum value of the aircraft parameter, as shown at block 232 and 234.

However, $n_x$ is just one way of detecting critical controllability conditions. There could be other parameters that could be equally effective that may be used, such as angle of attack, flight path angle, pitch angle, or a total aircraft energy computation, for example. Any of these parameters could be used separately or in combination with each other to accomplish detection of an STL triggering condition.

FIG. 18 shows a flowchart of an example method for use with the method 200, according to an example implementation. At block 208 of the method 200, reducing the thrust produced by each of the engines 106 and 108 comprises reducing the thrust by a first amount, additional functions include after reducing the thrust, measuring a second value of the aircraft parameter and based on the second measured value exceeding the maximum value, reducing the thrust produced by each of the engines 106 and 108 by a second amount that is larger than the first amount, as shown at blocks 236 and 238.

FIG. 19 shows a flowchart of an example method for use with the method 200, according to an example implementation. At block 240, functions include iteratively measuring the value of the aircraft parameter and reducing the thrust produced by each of the engines 106 and 108 until the measured value of the aircraft parameter is below the maximum value of the aircraft parameter.

Within examples described herein, the STL function actively manages excess thrust capability under specific critical conditions to meet design requirements while alleviating impacts that have affected prior solutions. The STL provides additional degrees of freedom to aircraft design and build that can be used to find an appropriate balance of system complexity, aerodynamic performance, loadability, and aircraft cost. Namely, the STL function actively manages thrust generated by all engines to ensure prompt nose-down recovery of the aircraft at critical conditions without having to add complexity to the aircraft design, increase weight, and/or costs, which are typically associated with managing such condition. This advantage could include performance improvement and cost savings (both recurring and non-recurring).

The STL function further lowers drawbacks associated with the need for accurate pre-flight predictions of aerodynamic pitch-up at high AOA, which may be required prior to flight test and certification. In some instances, different pitch-up characteristics are discovered during flight tests as compared to the predicted levels requiring late modifications to designs. These late discoveries can have negative impacts on program schedule, cost, and further loss of performance capability.

In addition, aircraft that operate with the STL function can meet the high alpha recovery requirements, enabling balancing anti-ice spanwise coverage vs. engine bleed-air or electric power generation capability vs. pitch-up (which impacts build cost and aircraft weight), possibly allowing for complete removal of anti-ice systems or replacement with alternate electrical ice protection concepts (which impacts system complexity, weight, engine bleed/electrical requirements), allowing for simplified leading edge designs by removing autoslat (which impacts system complexity and build cost), enabling stronger inboard leading edge to improve landing performance by reducing approach speed (impacting performance), and allowing for removal of aft center of gravity cutback at light weights (impacting loadability).

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of controlling thrust produced by a plurality of engines on an aircraft for assisting with nose-down recovery of the aircraft, the method comprising:
   selecting a maximum value of an aircraft parameter to be a value greater than a value achievable by the aircraft in flight with one engine failed of the plurality of engines;
   measuring a value of the aircraft parameter while the aircraft is in flight;
   based on a comparison of the maximum value and the measured value, determining that the measured value exceeds the maximum value;
   setting a maximum amount by which a thrust produced by each of the engines of the plurality of engines may be reduced to preserve a required climb capability; and
   reducing the thrust produced by each of the engines of the plurality of engines within the maximum amount to bring the measured value of the aircraft parameter below the maximum value of the aircraft parameter, only when all engines of the plurality of engines are operating.

2. The method of claim 1, wherein selecting the maximum value of the aircraft parameter comprises selecting a maximum value of a longitudinal acceleration ($N_x$) of the aircraft.

3. The method of claim 1, wherein selecting the maximum value of the aircraft parameter comprises selecting a maximum value of an angle of attack (AoA) of the aircraft.

4. The method of claim 1, wherein selecting the maximum value of the aircraft parameter comprises selecting a maximum value of a flight path angle of the aircraft.

5. The method of claim 1, wherein selecting the maximum value of the aircraft parameter comprises selecting a maximum value of a pitch angle of the aircraft.

6. The method of claim 1, wherein selecting the maximum value of the aircraft parameter comprises:
   selecting the maximum value to be at a limit that provides recovery capability of the aircraft at an angle of attack (AOA) above a threshold.

7. The method of claim 1, wherein selecting the maximum value of the aircraft parameter comprises:
   selecting the maximum value of the aircraft parameter based on a weight of the aircraft.

8. The method of claim 1, wherein measuring the value of the aircraft parameter while the aircraft is in flight comprises:
   measuring a longitudinal acceleration, wherein the longitudinal acceleration is a measure of excess thrust relative to drag and weight of the aircraft.

9. The method of claim 1, wherein reducing the thrust produced by each of the engines comprises:
   reducing the thrust by an amount proportionate to an amount that the measured value exceeds the maximum value.

10. The method of claim 1, further comprising:
    determining that a nose-down recovery condition exists; and
    based on the determination of the nose-down recovery condition,
       measuring the value of the aircraft parameter while the aircraft is in flight; and
       reducing the thrust produced by each of the engines to bring the measured value of the aircraft parameter below the maximum value of the aircraft parameter.

11. The method of claim 1, wherein reducing the thrust produced by each of the engines comprises reducing the thrust by a first amount, and the method further comprises:
    after reducing the thrust, measuring a second value of the aircraft parameter; and
    based on the second measured value exceeding the maximum value, reducing the thrust produced by each of the engines by a second amount that is larger than the first amount.

12. The method of claim 1, further comprising:
    iteratively measuring the value of the aircraft parameter and reducing the thrust produced by each of the engines until the measured value of the aircraft parameter is below the maximum value of the aircraft parameter.

13. A non-transitory computer readable medium having stored thereon instructions, that when executed by one or more processors of a computing device, cause the computing device to perform functions comprising:
    selecting a maximum value of an aircraft parameter to be a value greater than a value achievable by the aircraft in flight with one engine failed of the plurality of engines;
    measuring a value of the aircraft parameter while the aircraft is in flight;
    based on a comparison of the maximum value and the measured value, determining that the measured value exceeds the maximum value;
    setting a maximum amount by which a thrust produced by each of the engines of the plurality of engines may be reduced to preserve a required climb capability; and
    reducing the thrust produced by each of the engines of the plurality of engines within the maximum amount to bring the measured value of the aircraft parameter below the maximum value of the aircraft parameter, only when all engines of the plurality of engines are operating.

14. The non-transitory computer readable medium of claim 13, wherein measuring the value of the aircraft parameter while the aircraft is in flight comprises:
    measuring a longitudinal acceleration, wherein the longitudinal acceleration is a measure of excess thrust relative to drag and weight of the aircraft.

15. The non-transitory computer readable medium of claim 13, wherein reducing the thrust produced by each of the engines comprises:
reducing the thrust by an amount proportionate to an amount that the measured value exceeds the maximum value.

16. A system comprising:
a flight control computing device having a processor and memory storing instructions executable by the processor to:
select a maximum value of an aircraft parameter of an aircraft to be a value greater than a value achievable by the aircraft in flight with one engine failed of the plurality of engines;
receive a measurement of a value of the aircraft parameter while the aircraft is in flight;
based on a comparison of the maximum value and the measurement, determine that the measurement exceeds the maximum value;
set a maximum amount by which a thrust produced by each engine of a plurality of engines of the aircraft may be reduced to preserve a required climb capability; and
send a signal indicating to reduce the thrust produced by each engine of a plurality of engines of the aircraft within the maximum amount to bring the measurement below the maximum value of the aircraft parameter, only when all engines of the plurality of engines are operating; and
a plurality of propulsion control computing devices coupled to the plurality of engines of the aircraft, wherein a respective propulsion control computing device is coupled to a respective engine, and wherein each propulsion control computing device has a processor and memory storing instructions executable by the processor to receive the signal from the flight control computing device and to control thrust produced by the respective engine of the plurality of engines.

17. The system of claim 16, wherein the plurality of propulsion control computing devices control thrust produced by each engine of the plurality of engines independently of each other.

18. The system of claim 16, further comprising:
an inertial reference unit (IRU) to measure the value of the aircraft parameter while the aircraft is in flight, and to output the measurement of the value of the aircraft parameter to the flight control computing device.

19. The method of claim 1, further comprising:
prohibiting thrust reduction if less than a threshold number of the plurality of engines are operating on the aircraft.

20. The non-transitory computer readable medium of claim 13, wherein the functions further comprise:
iteratively measuring the value of the aircraft parameter and reducing the thrust produced by each of the engines until the measured value of the aircraft parameter is below the maximum value of the aircraft parameter.

* * * * *